United States Patent [19]
Miyamoto et al.

[11] Patent Number: 6,097,364
[45] Date of Patent: *Aug. 1, 2000

[54] DISPLAY CONTROL APPARATUS WHICH COMPRESSES IMAGE DATA TO REDUCE THE SIZE OF A DISPLAY MEMORY

[75] Inventors: Katsuhiro Miyamoto, Isehara; Takashi Tsunoda, Yokohama; Hideo Kanno, Yokohama; Hiroshi Inoue, Yokohama; Yuichi Matsumoto, Tokyo, all of Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/916,949

[22] Filed: Aug. 25, 1997

Related U.S. Application Data

[63] Continuation of application No. 08/515,760, Aug. 15, 1995, abandoned, which is a continuation of application No. 08/097,045, Jul. 27, 1993, abandoned.

[30] Foreign Application Priority Data

Jul. 29, 1992 [JP] Japan .................................... 4-202539

[51] Int. Cl.[7] ...................................................... G09G 3/36
[52] U.S. Cl. ................................................ 345/97; 345/202
[58] Field of Search ................................ 345/89, 97, 147, 345/202, 98; 382/232, 237

[56] References Cited

U.S. PATENT DOCUMENTS

| | | | |
|---|---|---|---|
| 3,599,178 | 8/1971 | Jackson | 345/202 |
| 4,117,470 | 9/1978 | Elliott | 345/202 |
| 4,921,334 | 5/1990 | Akodes | 345/89 |
| 4,992,782 | 2/1991 | Sakamoto et al. | 345/202 |

FOREIGN PATENT DOCUMENTS

0368117  5/1990  European Pat. Off. ................. 345/97

*Primary Examiner*—Regina Liang
*Attorney, Agent, or Firm*—Fitzpatrick Cella Harper & Scinto

[57] ABSTRACT

A display controller includes an input device which inputs image data in a first form, and a processor which processes the image data and outputs a control signal which controls a display device. The processor includes a convertor which converts the image data in the first form to image data in a second form. A detector detects a partial area to be rewritten in an image by performing a comparison using the image data in the second form.

17 Claims, 4 Drawing Sheets

V<Vth

FIG. 3C

Vth<V<Vsat

FIG. 3D

Vsat<V

FIG. 4

DISPLAY CONTROL APPARATUS WHICH COMPRESSES IMAGE DATA TO REDUCE THE SIZE OF A DISPLAY MEMORY

This application is a continuation of application Ser. No. 08/515,760 filed Aug. 15, 1995, now abandoned, which is a continuation of appln. Ser. No. 08/097,045, filed Jul. 27, 1993, abandoned.

BACKGROUND OF THE INVENTION

1. Field of the Invention

The present invention relates to a display control apparatus for controlling the display of a display device.

2. Related Background Art

In a recent display system of a computer, a system to read in not only characters and lines but also a natural image and combine it with the characters and lines for display has been put into practice. This means that a halftone (gray level) display function of a display device (liquid crystal, plasma or EL) in the display system has become an important part. However, the halftone display is hot easy in a display device other than a CRT, for example, a liquid crystal display device, particularly a ferroelectric liquid crystal display device.

As to a display element which uses the ferroelectric liquid crystal (FLC), it has been known to arrange two glass substrates to face each other while maintaining a cell gap of 1–3 $\mu$m and form transparent electrodes on the facing planes thereof, and to orient the transparent electrodes to form a liquid crystal cell, in which ferroelectric liquid crystal is filled, as disclosed in U.S. Pat. No. 4,964,699.

Features of the display element which uses the ferroelectric liquid crystal are that the ferroelectric liquid crystal has a spontaneous polarization which can be used for switching an external electric field and a coupling force of the spontaneous polarization, and that it can be switched by a polarity of the external electric field because a longitudinal direction of a ferroelectric liquid crystal molecule corresponds to a direction of polarization of the spontaneous polarization.

The ferroelectric liquid crystal is primarily used for a binary (black and white) display element by using a light transmission state and a light block state as two stable states.

Figure 2:
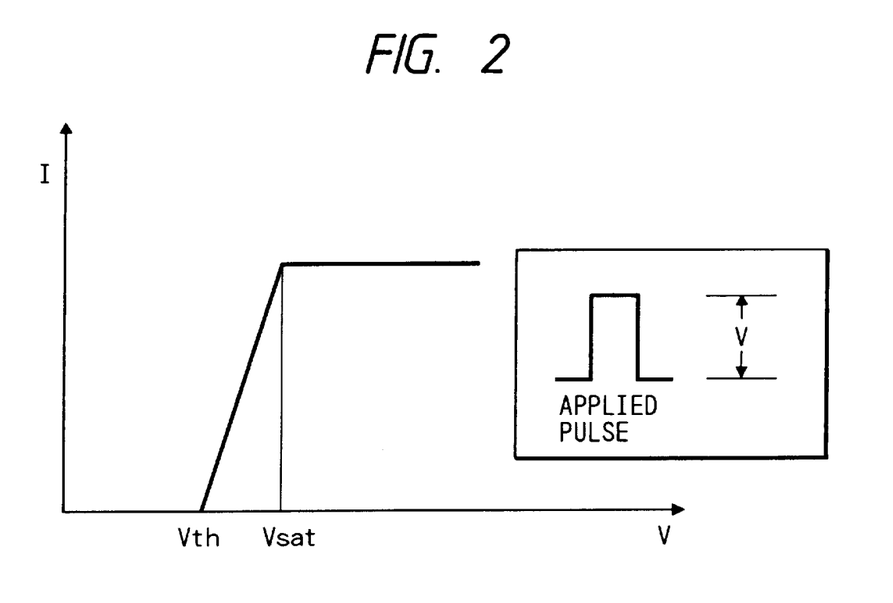
FIG. 2 shows an applied voltage versus transmitted light intensity characteristic chart of an FLC.
Figure 3A:
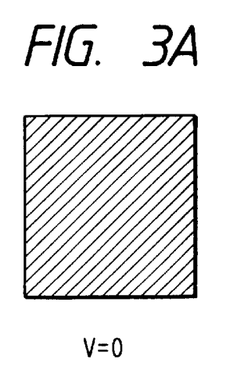
FIGS. 3A to 3D show pixel status charts under the application of the pulse voltage.
Figure 3B:
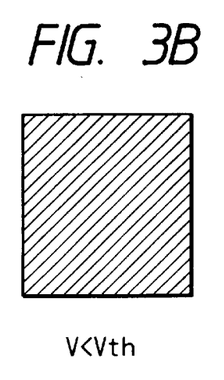
Figure 3C:
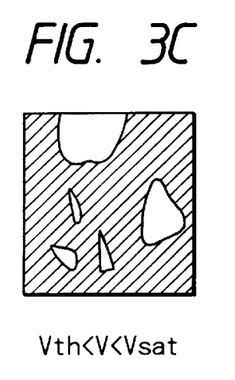
Figure 3D:
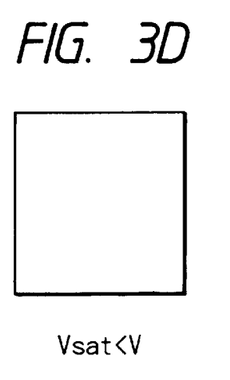

FIG. 2 shows a relation between an amplitude of a switching pulse of a ferroelectric liquid crystal element and a transmission factor. A transmitted light intensity I when a one-shot pulse of one polarity is applied to a cell (element) in a perfectly light blocking (black) state is plotted as a function of an amplitude V of the one-shot pulse. When the pulse amplitude is lower than a threshold Vth (V<Vth), the transmitted light intensity does not change and the transmission status of a pixel after the application of the pulse does not change from a status of the pixel prior to the application shown in FIG. 3A, as shown in FIG. 3B. When the pulse amplitude V exceeds the threshold (Vth<V<Vsat), portions of pixels shift to the other stable state, that is, a light transmission status shown in FIG. 3C so that an intermediate light transmission is exhibited as a total. When the pulse amplitude V further increases and exceeds a saturation level Vsat (Vsat<V), all pixels are shifted to the light transmission status and the light intensity reaches a constant level as shown in FIG. 3D.

As seen from FIGS. 2 and 3A to 3D, the pulse amplitude V should be controlled to meet the condition of Vth<V<Vsat in order to conduct the halftone display in the ferroelectric liquid crystal element. However, because a gradient of the light intensity between Vth and Vsat is sharp, it is difficult to accurately control the halftone by the pulse amplitude V. Since the relation between the voltage V and the transmitted light intensity I shown in FIG. 4 depends on the cell thickness and the temperature, different gradation levels may be displayed for applied pulses of the same voltage amplitude if a cell thickness distribution or a temperature distribution is included in the display panel.

While the FLC has been discussed above, the same is applied to TN liquid crystal having no active element when a number of halftone levels are to be attained.

In order to solve the above problems, it has been proposed in U.S. patent application Ser. No. 08/062,214 to digitally process image information in the two states of FIGS. 3B and 3D to attain a pseudo halftone display (or quasi-gray level display).

On the other hand, a method of "low frame frequency drive+partial writing scan" (Japanese unexamined Patent Publication (KOKAI) No. 63-65494 and Japanese Unexamined Patent Publication (KOKAI) No. 63-285141) has been proposed as a drive method for high resolution display in the ferroelectric liquid crystal display or a display device having a memory property and it is an essential drive method in the ferroelectric liquid crystal drive.

However, the following problems arise when the multi-interlace scan by the low frame frequency drive and the random line scan by the partial writing drive are applied to the binary pseudo halftone display process.

In the binary pseudo halftone display process, a method by using an error spread has been known in which an error which is created by binarizing a pixel under consideration by a threshold is sequentially spread to periphery of the cell under consideration and the peripheral pixels having the errors distributed are binarized by threshold levels having the errors added thereto. The halftone information is saved in macro to conduct the pseudo halftone level display. Accordingly, in order to attain the reproducibility of pseudo halftone display, it is necessary to distribute the error to the periphery of the pixel in which the error has been created and the process by the non-interlace scan is required. If the binarization process is conducted in accordance with the multi-interlace and random interlace scan sequence to meet the above requirements, a positional balance of saving of the halftone information is destroyed and the reproducibility of the halftone is lowered.

Further, when the pseudo halftone process is conducted to all image signals sent from a computer, a character deformation or a drop of dot occurs in the character or a fine line. This is due to the fact that the pseudo halftone process conducts the halftone display in macro.

When the pseudo halftone processing function and the partial writing function are performed by a unit externally of the display device (for example, a unit in a computer), it is necessary to modify the software and the hardware for a graphic control unit in the computer. This means a difficulty in attaining university of the display device.

In order to solve the above problem, it is preferable to directly process a CRT display signal which is common in a display device of the computer. However, in order to receive the CRT display signal and detect the partial writing, a frame memory of at least one frame capacity is required because the CRT display signal is outputted frame by frame. This causes a problem of the increase of the capacity of the frame memory in a high resolution display device having more than 1000×1000 pixels, and the increase of a system cost and a size.

SUMMARY OF THE INVENTION

It is an object of the present invention to reduce a memory capacity required to detect a partial area to be rewritten in a field.

In order to achieve the above object, in accordance with the present invention, there is provided a display control apparatus comprising input means for inputting image data and processing means for processing the image data and outputting a control signal for controlling a display device, said processing means including compression means for compressing the image data supplied from said input means, memory means for storing the image data compressed by said compression means and detection means for detecting a partial area to be rewritten in an image represented by the image data supplied from said input means in accordance with the image data compressed by said compression means.

It is another object of the present invention to provide a method for configuring a system of pseudo halftone process, partial writing and multi-interlace scan.

It is other object of the present invention to introduce a technique of image area separation for discriminating a character/fine line area and a natural image having halftone, into a display system.

Other objects and aspects of the present invention will be apparent from the following description with reference to the accompanying drawings and the appended claims.

DETAILED DESCRIPTION OF THE PREFERRED EMBODIMENTS

Figure 1:
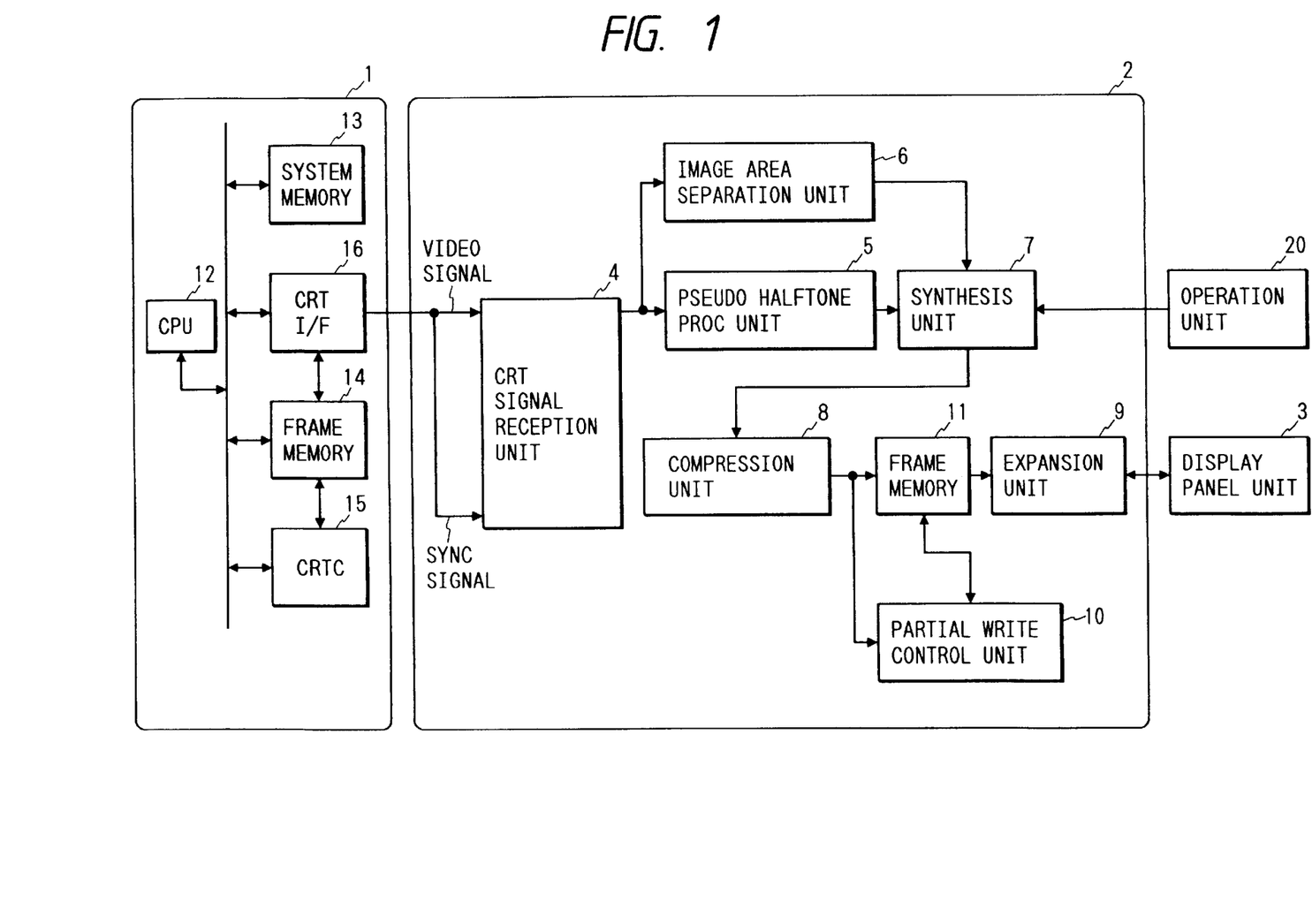
FIG. 1 shows a block diagram of a display system including an information processing system of a first embodiment of the present invention.

FIG. 1 shows a block diagram of a configuration of a first embodiment of an information processing system having a display control apparatus of the present invention.

The present embodiment is now explained with reference to the drawings.

Functions of units of FIG. 1 are first explained.

In FIG. 1, numeral 1 denotes a computer, for example a workstation (SUN, HP, DEC, IBM, NeXT, etc.) or a personal computer (IBM, Apple, etc.) which is an information supply source to an information processing system 2 of the present invention.

Numeral 3 denotes a display panel unit (which includes ferroelectric liquid crystal disclosed in U.S. Pat. No. 4,964,699) for displaying image information of the computer 2. The unit includes a drive circuit for driving the panel, a control circuit for optimizing the drive to the panel, a panel back light and a power supply.

Numeral 4 denotes a CRT signal reception unit which receives a CRT display signal (image signal and sync signal) outputted from the computer 1 and converts it to a signal suitable to the processing units of the next stage. Since the CRT display signal of a common computer is an analog video signal, the reception unit comprises an A/D converter and a sampling clock generator for the A/D conversion.

Numeral 5 denotes a pseudo halftone processing unit which has a function to conduct the binary (or multi-value) pseudo halftone processing for each of R, G and B planes for the video signal converted by the multi-level digital conversion by the CRT signal reception unit 4.

The following methods may be used as the binary (or multi-level) pseudo halftone processing method.

<Error Spread Method>

Binarization (or multi-level conversion) errors which are created in binarizing (or multi-level converting) peripheral pixels of a pixel under consideration (pixels before processing the pixel under consideration) are weighted and they are added to the pixel under consideration, and the binarization is conducted at a fixed threshold.

<Mean Density Reservation Method>

A threshold for the binarization is not fixed but it is determined based on a weighted mean value derived from binary data in the vicinity of the pixel under consideration.

The pseudo halftone processing is attained by at least one of the above methods. Means for executing those methods may be provided and one of the methods may be selected by a user from an operation unit 20.

Numeral 6 denotes an image area separation unit (including a binarization process by a fixed threshold) which separates information which is not to be displayed by the pseudo halftone display such as characters and lines from image signal sent from the CRT display signal reception unit 4. It also includes a unit for conducting the binarization by a fixed threshold when the pseudo halftone processing is not conducted. An example of the image area separation method in the image area separation unit 6 is explained below.

<Brilliance Discrimination Separation Method>

The separation is made in accordance with a brilliance of a CRT display signal.

In general, since the characters and fine lines in the computer have important information on an image screen, the brilliance thereof is relatively high. Thus, portions of the CRT display signal which have high brilliance are discriminated and separated.

Numeral 7 denotes a synthesis unit which selectively outputs the data produced by the pseudo halftone processing unit 5 and the binarized data by the simple threshold produced by the image area separation unit 6. The portions discriminated as the characters and lines by the image area separation unit 6 are outputted as the binarized data by the simple threshold. The user of the display system may switch the function by the operation unit 20. Namely, the user may select from the operation unit 20 one of the three modes, a character mode in which the binarized data by the fixed threshold is selected without regard to the discrimination by the image area separation unit 6, a halftone mode in which the binarized data produced by the pseudo halftone processing without regard to the discrimination and an image area separation mode in which the binarized data is selectively outputted based on the discrimination by the image area separation unit 6.

Numeral 8 denotes a compression unit which has a function to compress the pseudo halftone processed binary data in order to reduce a capacity of the frame memory 11 in storing it in the frame memory 11.

In the present embodiment, a reversible encoding system is used to precisely extract a partial write position. Particularly, an entropy encoding method which uses arithmetic encoding which is suitable for the compression of the pseudo halftone processed binary data is used.

Numeral 9 denotes an expansion unit which has a function to expand or decompress one frame of binary data stored in the frame memory 11.

Numeral 10 denotes a partial write control unit which has a function to detect only updated image data in the frame in the display device having the memory property such as the FLCD of the present embodiment and preferentially output the updated portion of the data to the display device by this function, the updated portion can be preferentially drawn even in a display device of a relatively slow display speed.

Numeral 11 denotes the frame memory which stores image data necessary for the partial write detection.

Numeral 12 denotes a CPU for controlling the computer 2, numeral 13 denotes a CPU system memory for controlling the computer 2, numeral 14 denotes the frame memory for storing the image information of the computer 2, numeral 15 denotes a CRT controller for controlling the frame memory 14 for the CRT signal, and numeral 16 denotes a CRT interface for converting (including analog conversion and color conversion) the image data from the frame memory 14 to the CRT signal.

An operation of the information processing system of the present embodiment is now explained with reference to FIG. 1.

The computer 2 which is an image information source outputs the image information stored in the frame memory 14 in accordance with the CRT 15 controlled by the CPU 12 to output the CRT display signal. The CRT display signal is divided into a video signal (R, G and B 3-system analog signals for color display, and a 1-system analog signal for monochromatic display) and a sync signal (signals for sectioning the video signal by line and by frame, which are called a horizontal sync signal and a vertical sync signal, respectively). The CRT display signal is supplied to the CRT display signal reception unit 4 and the video signal is converted to a digital signal (comprising a plurality of bits). A sampling clock therefor is generated by multiplying the horizontal sync signal.

The digitized video signal is supplied to the binarization (or multi-level conversion) pseudo halftone processing unit 5 where it is converted to the binary or multi-level signal. In this conversion process, the CRT signal is converted in non-interlace mode to convert it from time to time and the distribution of the error and the calculation of the threshold in the pseudo halftone conversion can be done theoretically so that high halftone reproducibility is attained.

On the other hand, the digital signal from the CRT signal reception unit 4 is also supplied to the image area separation unit 6 where the signal which is not suitable for the pseudo halftone processing like the characters and lines is discriminated and only that portion is binarized (or multi-level converted) by the fixed threshold.

The binary (or multi-level) signal produced by the pseudo halftone processing unit 5 and the image area separation unit 6 is properly switched by the synthesis unit 7 and the selected signal is supplied to the compression unit 8. In the switching, the simple binary (or multi-level) signal produced by the image area separation unit 6 is preferentially outputted. The priority may be forcibly switched in the information processing unit 1 of the present invention by a user of the display system through the operation unit 20 or by a command from the computer 2. The switching is effective when the characters and lines are to be preferentially displayed or a natural image such as a photograph is to be preferentially displayed.

The compression unit 8 compresses the signal form the synthesis unit 7 and stores the compressed data in the frame memory 11. The compression unit 8 resets the compressed data line by line because the partial write control is conducted line by line.

The signal from the compression unit 8 is also sent to the partial write control unit 10. The partial write control unit 10 reads the compressed data of one frame back from the frame memory and compares it with the compressed data sent from the compressed data line by line. The partial write control unit 10 detects a line including non-matched pixels based on the two compressed data and controls the readout of the compressed data from the frame memory 11 so that the compressed data of that line is preferentially outputted to the expansion unit 9.

The display panel unit 13 receives the line signal from the information processing system 1 of the present invention and draws the image information on the display panel in accordance with the line information and the line signal.

In accordance with the present embodiment, since the image data of the previous frame which is necessary for detecting the area in the displayed image in which the partial writing is to be done is retained as the compressed data, the memory capacity can be reduced and the configuration of the display control apparatus can be simplified.

Further, in accordance with the present embodiment, since the detection of the above area is done by the comparison of the compressed data, no expansion process is required in the partial write control unit 10 and high speed detection is attained.

The compression may be done not line by line but several lines at a time or field by field. In this case, the compression efficiency can be improved. The difference between the previous screen and the screen under consideration may be done by expanding the compressed data and comparing the expanded data pixel by pixel.

The compression method is not limited to the compression of the binary data described above but a multi-level image compression method may be used. For example, a so-called ADCT (adaptive discrete cosine transform) proposed by JPEG in which orthogonal transform is done block by block, transform coefficients are quantized and Huffman-coded may be used to attain a high efficiency compression.

Figure 4:
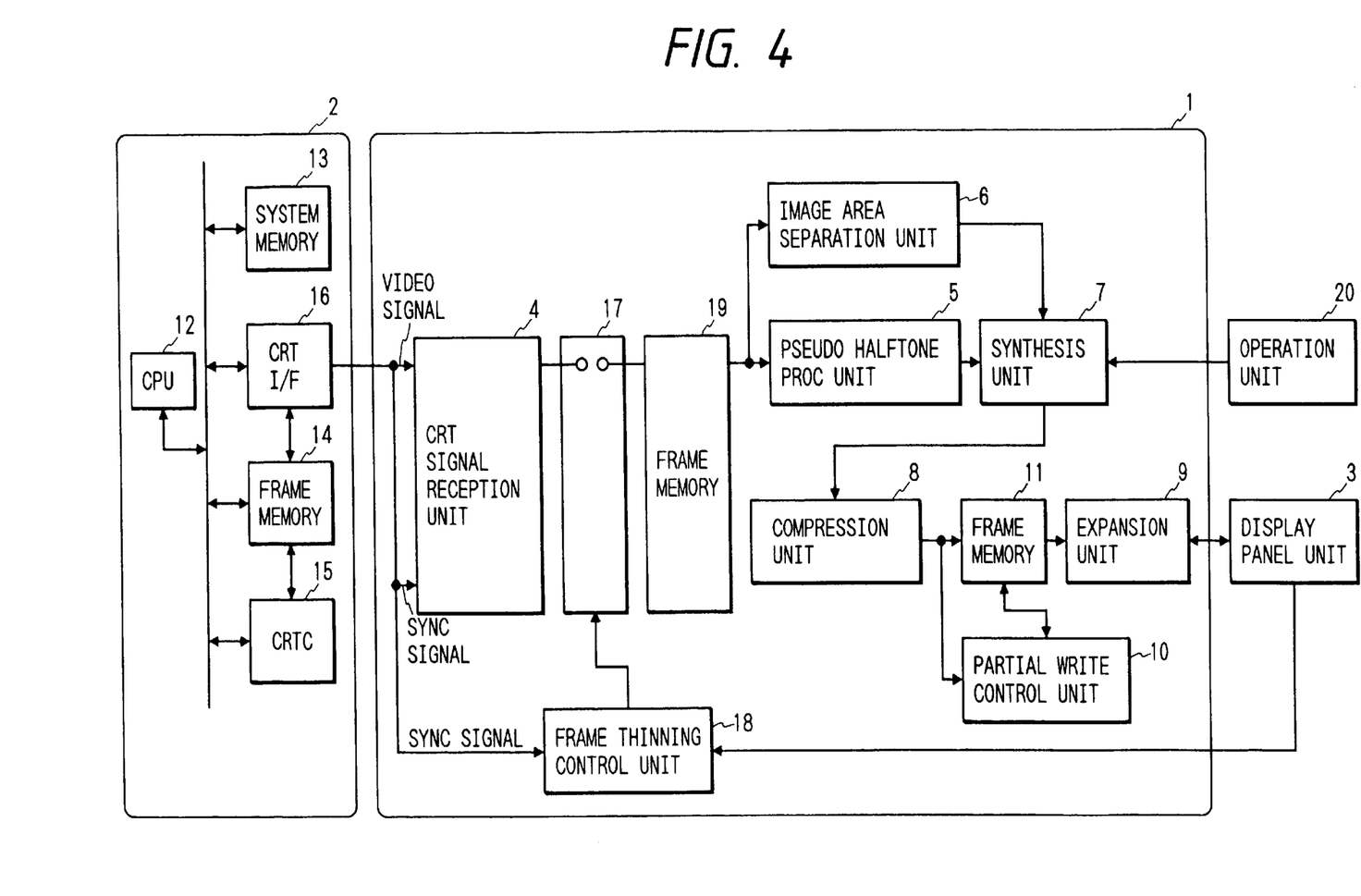
FIG. 4 shows a display system block diagram of a second embodiment of the present invention.

In a second embodiment of the present invention shown in FIG. 4, the input CRT video signals are reduced in number in each frame and it is temporarily stored in the frame memory and the binary (or multi-level) pseudo halftone processing is conducted at a lower speed than the input video signal speed.

When a draw speed of the display panel unit is slower than an input transfer speed of the input video signal, not all of the binary (or multi-level) signals are drawn and it is wasteful to conduct the binary (or multi-level) pseudo halftone processing to all of the input video signals. Thus, in the present embodiment, the input video signals are reduced in number for each frame in accordance with the draw speed of the display panel unit. As a result, the time to conduct the binary (or multi-level) pseudo halftone processing is increased by the time corresponding to the reduced frames and the pseudo halftone processing speed may be lowered.

Thus, when the binary (or multi-level) pseudo halftone processing unit is implemented by an IC, the heat generation and the malfunction due to the high speed operation may be suppressed.

An operation of FIG. 4 is briefly explained. (Those explained in connection with FIG. 1 are omitted).

In FIG. 4, numeral 17 denotes a gate which receives a digital video signal converted by the CRT signal reception unit 4 at a frame period of the frame memory 19. The gate 17 is opened and closed by a frame thinning control unit 18.

The frame thinning control unit 18 controls to open the gate 17 for one frame period at a period of an integer multiple of the CRT signal frame signal in accordance with the draw speed of the display panel unit 13. Accordingly, the panel is variable with a condition relating to the operation of the panel unit 13. The period may be fixed.

In the present embodiment, the digital signals are reduced in number before they are stored in the frame memory 19. Alternatively, the period of conversion of an A/D converter in the CRT signal reception unit 4 may be controlled.

Figure 5:
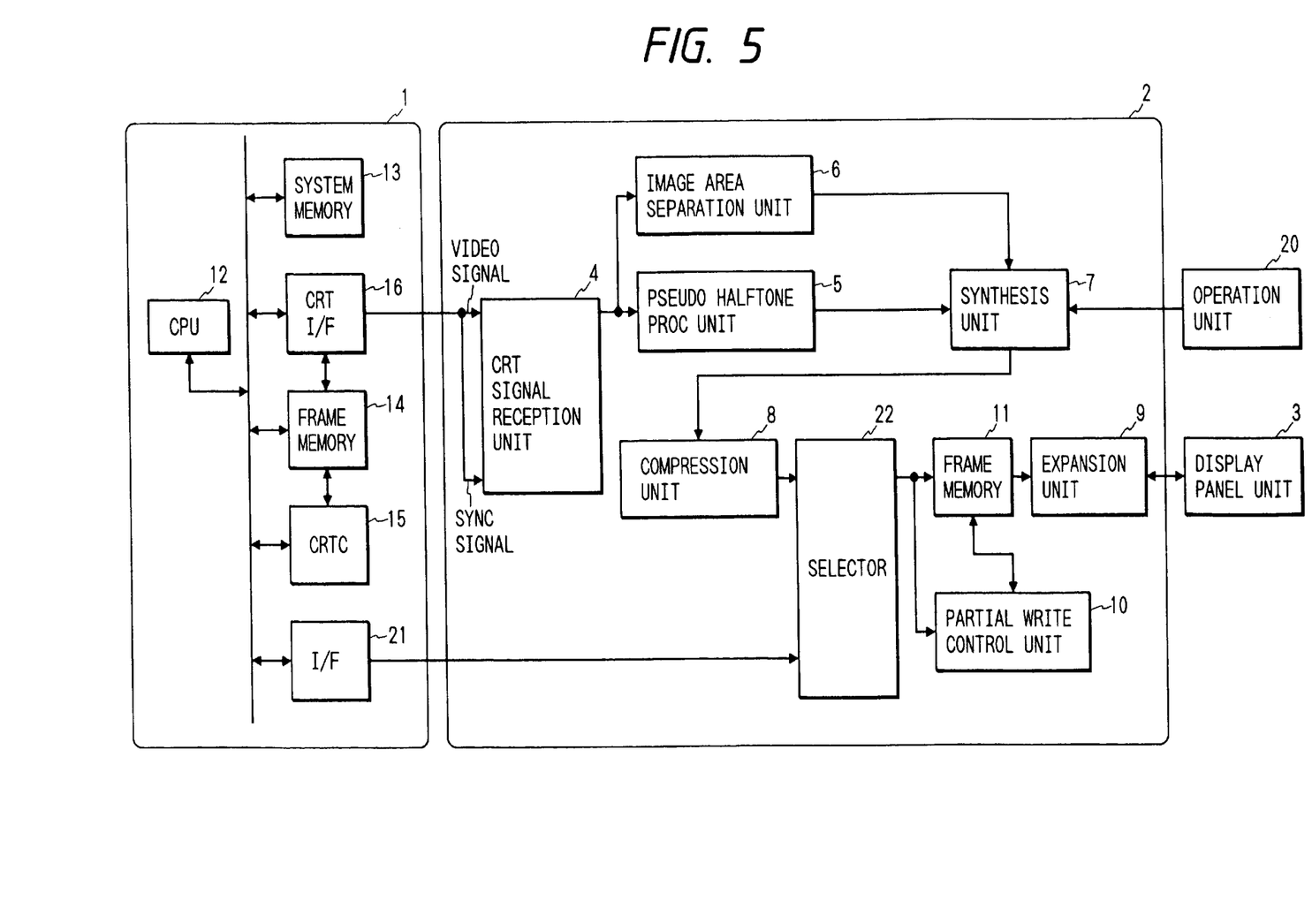
FIG. 5 shows a display system block diagram of a third embodiment of the present invention.

FIG. 5 shows a block diagram of a display system of a third embodiment of the present invention. It differs from the configuration of FIG. 1 in that a video signal compressed in a compression method which permits the expansion by the expansion unit 9 is supplied to the information processing system 2, and the CRT display signal compressed by the compression unit 8 and the compressed video signal are selected by a selector 22.

In the present embodiment, the compressed video signal which is previously pseudo halftone processed is applied to the selector 22 through an interface 23 and the selector 22 selects the data from the compressor 8 or the data from the interface 21 and outputs it to the frame memory 11 and the partial write control unit 10.

In the present embodiment, where the pseudo halftone processing and the compression are previously conducted by the computer, the transfer time of the video signal may be reduced.

Where an animation is to be stored in a hard disk connected to the computer 1, the volume of data can be reduced.

Both the CRT display signal and the compressed data can be selectively used as the display signal, the applicability is enhanced.

In the display system which uses the information processing system of the present invention, the gray level display can be attained in macro even in the display device which has no gray level display function and combined display of the natural image and the characters and lines which is recently realized as multi-media can be attained.

A universal display panel which may be connected without modifying the system in the computer in a computer system compatible to the CRT device which is currently a main display device is attained.

The present invention is not limited to the above embodiments but various modifications and changes may be made without departing from the scope of the claims.

What is claimed is:

1. An image processing apparatus comprising:
    input means for successively inputting image data;
    compression means for compressing the input image data;
    storing means for storing the compressed image data in a memory;
    detection means for detecting a change portion being changed from a previous image within one screen on a basis of the compressed image data, without expanding the compressed image data;
    control means for preferentially reading the compressed image data corresponding to the change portion detected by said detection means, from said memory; and
    expansion means for expanding the compressed image data read by said control means.

2. An apparatus according to claim 1, wherein said input means inputs the image data from an external computer.

3. An apparatus according to claim 1, further comprising output means for outputting the image data expanded by said expansion means to a display device.

4. An apparatus according to claim 3, wherein said display device includes liquid crystal.

5. An apparatus according to claim 4, wherein said liquid crystal has a memory function.

6. An apparatus according to claim 5, wherein said liquid crystal is a ferroelectric liquid crystal.

7. An apparatus according to claim 6, further comprising a display unit including said display device.

8. An apparatus according to claim 3, further comprising reduction means for reducing the image data supplied from said input means so as to control frame rate.

9. An apparatus according to claim 8, wherein said reduction means controls the frame rate according to displayed speed on said display device.

10. An apparatus according to claim 1, further comprising second input means for inputting compressed image data.

11. An apparatus according to claim 10, wherein said expansion means selectively expands the compressed image data read by said control means and the compressed image data input by said second input means.

12. An apparatus according to claim 1, wherein said input means includes processing means for conducting halftone processing of the image data.

13. A display device including the apparatus according to claim 1.

14. An image processing method comprising the steps of:
    successively inputting image data;
    compressing the input image data;
    storing the compressed image data in a memory;
    detecting a change portion being changed from a previous image within one screen on a basis of the compressed image data without expanding the compressed image data;
    preferentially reading the compressed image data corresponding to the detected change portion, from said memory; and
    expanding the read compressed image data.

15. A method according to claim 14, further comprising an outputting step of outputting the expanded image data to a display device.

16. A method according to claim 15, wherein said display means includes a liquid crystal.

17. A method according to claim 16, wherein said liquid crystal is a ferroelectric liquid crystal.

* * * * *

UNITED STATES PATENT AND TRADEMARK OFFICE
CERTIFICATE OF CORRECTION

PATENT NO. : 6,097,364
DATED : August 1, 2000
INVENTOR(S) : KATSUHIRO MIYAMOTO ET AL.   Page 1 of 2

It is certified that error appears in the above-identified patent and that said Letters Patent is hereby corrected as shown below:

ON THE TITLE PAGE:

[56] References Cited, under FOREIGN PATENT DOCUMENTS

Insert: --5,129,011  7/1992  Nishikawa et al. ... 345/202--.

COLUMN 2:

Line 56, "university" should read --universality--.

COLUMN 3:

Line 21, "other" should read --still another--.

UNITED STATES PATENT AND TRADEMARK OFFICE
CERTIFICATE OF CORRECTION

PATENT NO.   : 6,097,364
DATED        : August 1, 2000
INVENTOR(S)  : KATSUHIRO MIYAMOTO ET AL.

Page 2 of 2

It is certified that error appears in the above-identified patent and that said Letters Patent is hereby corrected as shown below:

<u>COLUMN 6</u>:

```
Line 1,  "is-effective" should read --is effective--;
Line 5,  "form" should read --from--;
Line 15, "readout" should read --read-out--; and
Line 43, "transform" should read --transformation--.
```

Signed and Sealed this

Twenty-second Day of May, 2001

Attest:

NICHOLAS P. GODICI

Attesting Officer   Acting Director of the United States Patent and Trademark Office